US007743196B2

(12) United States Patent
Simkins (10) Patent No.: US 7,743,196 B2
(45) Date of Patent: Jun. 22, 2010

(54) INTERFACE WITH MULTIPLE PACKET PREEMPTION BASED ON START INDICATORS OF DIFFERENT TYPES

(75) Inventor: Mark Benjamin Simkins, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 322 days.

(21) Appl. No.: 11/839,002

(22) Filed: Aug. 15, 2007

(65) Prior Publication Data

US 2009/0049223 A1 Feb. 19, 2009

(51) Int. Cl.
*G06F 13/14* (2006.01)
*H04L 12/28* (2006.01)
*H04J 3/24* (2006.01)

(52) U.S. Cl. .................. 710/305; 710/107; 370/218; 370/395.42; 370/474; 370/902; 718/107

(58) Field of Classification Search .................. 370/474, 370/218, 902
See application file for complete search history.

(56) References Cited

U.S. PATENT DOCUMENTS

| 5,343,473 | A  | * | 8/1994  | Cidon et al. ................. 370/465 |
| 6,668,297 | B1 | * | 12/2003 | Karr et al. .................... 710/305 |
| 6,671,758 | B1 | * | 12/2003 | Cam et al. .................... 710/100 |
| 6,850,523 | B1 | * | 2/2005  | Karr et al. ............... 370/395.21 |
| 6,850,526 | B2 | * | 2/2005  | Tan et al. ................... 370/395.6 |
| 7,411,972 | B2 | * | 8/2008  | Khan et al. .................. 370/449 |
| 7,433,303 | B2 | * | 10/2008 | She et al. .................... 370/229 |
| 7,542,425 | B2 | * | 6/2009  | Grant et al. .................. 370/236 |
| 7,558,269 | B2 | * | 7/2009  | Le Pennec et al. ..... 370/395.42 |
| 7,580,426 | B2 | * | 8/2009  | Simkins ....................... 370/474 |
| 2004/0004975 | A1 |  | 1/2004  | Shin et al. |
| 2005/0005021 | A1 | * | 1/2005  | Grant et al. .................. 709/232 |
| 2005/0138259 | A1 |  | 6/2005  | Khan et al. |
| 2005/0169298 | A1 |  | 8/2005  | Khan et al. |
| 2006/0268692 | A1 | * | 11/2006 | Wright et al. ............... 370/229 |

OTHER PUBLICATIONS

"Implications of Precedence and Preemption Requirements on Packet Based Transport Architectures" b R.G. Cole and B.S. Farroha, JHU Applied Physics Laboratory; Dated 2007, 8 pages.*

(Continued)

*Primary Examiner*—Mark Rinehart
*Assistant Examiner*—Brian T Misiura
(74) *Attorney, Agent, or Firm*—Ryan, Mason & Lewis, LLP (57) ABSTRACT

Preemption techniques are disclosed which permit multiple high-priority packets to preempt a single low-priority packet. In one aspect, a first device is configured for communication with a second device via an interface bus. The first device comprises interface circuitry configured to receive from the second device a start indicator of a first type and a start indicator of a second type, and to allow at least one data segment associated with the start indicator of the second type to preempt at least one data segment associated with the start indicator of the first type. The start indicator of the second type may have a longer pulse width than that of the start indicator of the first type, such as a double-length pulse width. The first and second devices may comprise physical layer and link layer devices of a communication system.

20 Claims, 3 Drawing Sheets

OTHER PUBLICATIONS

Agere Systems—PayloadPlus Routing Switch Processor; Project Brief Apr. 2001, 5 pages.*

Agere Systems, Product Brief, "Edge/Access and Multiservice Network Processors: APP550 and APP530," pp. 1-4, May 2003.

Implementation Agreement OIF-SPI3-01.0, "System Packet Interface Level 3 (SPI-3): OC-48 System Interface for Physical and Link Layer Devices," Optical Internetworking Forum, pp. 1-42, 2001.

PMC-Sierra, Inc. "Packet Over Sonet, Implementing Packet Based SONET/SDH Links," White Paper, PMC-971161, Issue 1, 19 pages, downloaded from www.pmc-sierra.com/pdf/whitePaper-packetOverSonet.pdf on Aug. 23, 2006.

PMC-Sierra, Inc. "Saturn Compatible Packet Over Sonet Interface Specification for Physical Layer Devices," POS-PHY™, Level 2, PMC-971147, Issue 5, 41 pages, Dec. 1998.

ITU-T Recommendation G.993.2, Series G: Transmission Systems and Media, Digital Systems and Networks, "Very High Speed Digital Subscriber Line Transceivers 2 (VDSL2)," pp. 1-24, Feb. 2006.

* cited by examiner

INTERFACE WITH MULTIPLE PACKET PREEMPTION BASED ON START INDICATORS OF DIFFERENT TYPES

RELATED APPLICATION(S)

The present application is related to U.S. patent application Ser. No. 11/536,191, filed Sep. 28, 2006 and entitled "Interface with Multilevel Packet Preemption Based on Balancing of Start and End Indicators," which is commonly assigned herewith and incorporated by reference herein.

FIELD OF THE INVENTION

The present invention relates generally to communication devices for use in network-based communication systems, and more particularly to interfaces between a physical layer device and a link layer device.

BACKGROUND OF THE INVENTION

A network processor is one example of what is more generally referred to herein as a link layer device, where the term "link layer" generally denotes a switching function layer, also referred to as the data link layer in the well-known Open Systems Interconnection (OSI) model. Network processors and other link layer devices are commonly used to implement processing associated with various packet-based and cell-based protocols, such as, for example, Internet protocol (IP) and asynchronous transfer mode (ATM).

Communication between a physical layer device and a network processor or other type of link layer device may be implemented in accordance with an interface standard, such as the POS-2 standard described in "POS-PHY Saturn Compatible Packet Over SONET Interface Specification for Physical Layer Devices," Level 2, PMC-Sierra, Inc., 1998, which is incorporated by reference herein. Another example of a known interface standard is the SPI-3 interface standard described in Implementation Agreement OIF-SPI3-01.0, "System Packet Interface Level 3 (SPI-3): OC-48 System Interface for Physical and Link Layer Devices," Optical Internetworking Forum, 2001, also incorporated by reference herein.

A given physical layer device may comprise a multiple-port device which communicates over multiple channels with the link layer device. Such communication channels, also commonly known as MPHYs, may be viewed as examples of what are more generally referred to herein as physical layer device ports. A given set of MPHYs that are coupled to a link layer device may comprise multiple ports associated with a single physical layer device, multiple ports each associated with one of a plurality of different physical layer devices, or combinations of such arrangements. As is well known, a link layer device may be advantageously configured to detect backpressure for a particular MPHY via polling of the corresponding MPHY address on its associated physical layer device. The detected backpressure is used by the link layer device to provide flow control and other traffic management functions, thereby improving link utilization.

The above-noted interface standards generally specify techniques for addressing an MPHY and for moving payload data over the interface. The addressing may use the same or separate pins from the payload. For the POS-2 standard, the MPHY address uses pins that are separate from the payload, and the maximum number of MPHYs that can be specified is 31. There are well-known extensions to the POS-2 standard that increase the maximum number of MPHYs in increments of 31 by using additional pins. For the 8-bit mode of the SPI-3 standard, the MPHY address uses eight payload pins and thus the maximum number of MPHYs that can be specified is $2^8=256$.

U.S. patent application Ser. No. 11/466,858, filed Aug. 24, 2006 in the name of inventors A. P. Henry et al. and entitled "Port Addressing Method and Apparatus for Link Layer Interface," which is incorporated by reference herein, discloses efficient techniques for supporting much larger numbers of MPHYs in a multiservice environment while maintaining compliance with one or more interface standards. These techniques avoid the need for additional address pins, and also overcome other MPHY addressing problems of conventional practice, such as excessive memory requirements and bandwidth reduction.

Another issue that can arise in utilizing standard interfaces such as POS-2 and SPI-3 relates to packet preemption. Such packet preemption is permitted in, for example, certain applications in which the physical layer device comprises a digital subscriber line (DSL) transceiver. As a more particular example, ITU-T Recommendation G.993.2, "Very High Speed Digital Subscriber Line 2," February 2006, which is incorporated by reference herein, describes the standard requirements for a type of DSL referred to as VDSL-2. The VDSL-2 standard defines packet preemption as allowing for the transport of high-priority and low-priority packet flows through a single bearer channel. Typically, the transmission of a low-priority packet is paused, a high-priority packet is transmitted, and then the transmission of the low-priority packet is resumed. The VDSL-2 standard further states that preemption minimizes the packet insertion delay for the high-priority packets at the expense of a higher delay for the low-priority packets. Such preemption allows delay-critical traffic such as voice and video packets to have priority over other data packets such as web pages, email, etc.

In the VDSL-2 context, packet preemption is used in packet transfer mode, where packets are transferred to the VDSL-2 transceiver from a link layer device such as a network processor. The above-noted POS-2 or SPI-3 interfaces may be used to provide the interface between the VDSL-2 transceiver and the link layer device. Unfortunately, conventional implementations of the POS-2 or SPI-3 interfaces do not provide sufficient support for packet preemption. As a result, more complex signaling approaches are required, which can unduly increase the costs associated with a given implementation.

The above-cited U.S. patent application Ser. No. 11/536,191 provides techniques for configuring otherwise standard interfaces such as POS-2 or SPI-3 to facilitate the provision of multilevel packet preemption for DSL and other applications. Illustrative embodiments described therein provide multilevel packet preemption based on balancing of start and end indictors. By way of example, an arbitrary number n of levels of preemption may be provided, wherein n consecutive start indicators are received for n respective packets, and preemption of each of n−1 packets by packet n is confirmed by subsequent receipt of n consecutive end indicators. In one of the illustrative embodiments, the packets are directed to a common MPHY address, and the consecutive start indicators comprise multiple consecutive assertions of an xSOP signal for the same MPHY without intervening assertions of an xEOP signal. The multiple consecutive assertions of the xSOP signal for the same MPHY without intervening assertions of the xEOP signal are recognized as being indicative of appropriate preemptions if and only if followed by an equivalent number of consecutive assertions of the xEOP signal.

Despite the considerable advantages provided by the techniques disclosed in the above-cited U.S. patent application Ser. No. 11/536,191, a need remains for further improvements in packet preemption. For example, it would be desirable if a preemption technique could allow multiple high-priority packets to preempt a single low-priority packet.

SUMMARY OF THE INVENTION

The present invention meets the above-noted need by providing in one or more illustrative embodiments a modified standard interface which allows multiple high-priority packet preemptions of a single low-priority packet.

In one aspect of the invention, a first device is configured for communication with a second device via an interface bus. The first device comprises interface circuitry configured to receive from the second device a start indicator of a first type and a start indicator of a second type, and to allow at least one data segment associated with the start indicator of the second type to preempt at least one data segment associated with the start indicator of the first type. The start indicator of the second type may have a longer pulse width than that of the start indicator of the first type, such as a double-length pulse width.

In a given one of the illustrative embodiments, the first and second devices comprise physical layer and link layer devices of a communication system. The interface bus may be part of an otherwise conventional standard interface, such as a SPI-3 or POS-2 interface. The segments may be associated with or comprise packets, cells or other protocol data units (PDUs) communicated between the physical layer device and the link layer device via the interface bus.

As indicated above, multiple high-priority packets can preempt a single low-priority packet. For example, in one such arrangement, a plurality of start indicators of the second type are received, each having at least one data segment associated therewith. At least one data segment associated with each of the start indicators of the second type is allowed to preempt at least one data segment associated with the start indicator of the first type. The start indicators of the first and second types may have associated therewith respective end indicators of the first and second types. An end indicator associated with a given one of the start indicators of the second type may be received prior to another one of the start indicators of the second type.

Advantageously, the invention in the illustrative embodiments provides efficient support for multiple high-priority packet preemption using an otherwise conventional POS-2 or SPI-3 interface.

This considerably facilitates the use of packet preemption in numerous applications, such as VDSL-2 or other DSL applications.

DETAILED DESCRIPTION OF THE INVENTION

The invention will be illustrated herein in conjunction with an exemplary network-based communication system which includes a link layer device, a physical layer device and other elements configured in a particular manner. It should be understood, however, that the invention is more generally applicable to any system in which it is desirable to provide improved preemption as described herein. Also, although the illustrative embodiments will be described as involving packet preemption, the disclosed techniques are applicable to cells or other types of PDUs. The general term "data segment" will be used herein to denote packets, cells or other PDUs, or portions of such groupings of data.

A "link layer device" or LLD as the term is used herein refers generally to a network processor or other type of processor which performs processing operations associated with a link layer of a network-based system. Such a device may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

A "physical layer device" or PLD as the term is used herein refers generally to a device which provides an interface between a link layer device and a physical transmission medium of a network-based system.

Figure 1:
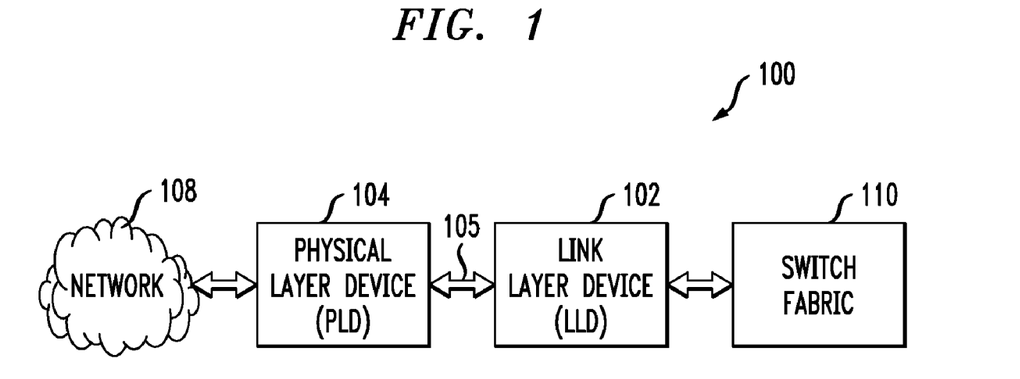
FIG. 1 is a simplified block diagram of a network-based communication system in accordance with an illustrative embodiment of the invention.

FIG. 1 shows a network-based communication system 100 in an illustrative embodiment of the invention. The system 100 includes a link layer device (LLD) 102 coupled to a physical layer device (PLD) 104 via an interface 105. The interface 105, which comprises an interface bus having multiple signal lines, may be configured as an otherwise conventional SPI-3, POS-2 or other similar interface, altered in a manner to be described below. The PLD 104 is coupled to a network 108. The LLD 102 is coupled to a switch fabric 110. The LLD 102 is configured to communicate packets, cells or other PDUs between the network 108 and the switch fabric 110 which controls switching of PDU data. A given LLD may, for example, include conventional capabilities to move traffic for different services using different scheduling algorithms.

The PLD 104 serves to interface the LLD to physical transmission media of the network 108. For example, the PLD 104 may comprise a DSL transceiver or an optical transceiver configured to interface the LLD to respective DSL or optical transmission media. Numerous other types of transmission media may be used in implementing the invention, and the PLD may be configured in a straightforward manner to accommodate such other media. In other embodiments, the PLD need not include a transceiver for interfacing with the network 108, and such a network transceiver may be implemented, by way of example, in a separate device that is arranged between the PLD and the network.

As indicated previously, packets, cells or other PDUs may be referred to herein as data segments. A given packet, cell or other PDU may also be comprised of multiple data segments. The term "data segment" as used herein is therefore intended to be broadly construed.

The LLD 102 may comprise, for example, an otherwise conventional network processor suitably modified to operate in the manner disclosed herein.

The PLD 104 may comprise one or more devices suitable for providing access termination and aggregation for multiple services, or any other physical layer device of a type known to those skilled in the art.

It is to be appreciated that the invention is not limited to use with any particular type of LLD or PLD. Numerous such devices suitable for use with the present invention are well known to those skilled in the art. The conventional aspects of these devices will therefore not be described in detail herein.

It is also possible that the LLD and the PLD may be integrated together into a single device, such as an ASIC. The terms LLD and PLD as used herein should therefore be understood to include any set of one or more functional components which perform respective LLD and PLD operations in a single device.

It should also be noted that the particular arrangement of system elements shown in FIG. 1 is by way of illustrative example only. More particularly, the invention can be implemented in any type of system having at least one LLD and at least one PLD, and is not limited to the particular processing applications described herein. The system 100 may include other elements in addition to or in place of those specifically shown, including one or more elements of a type commonly found in a conventional implementation of such a system.

Figure 2:
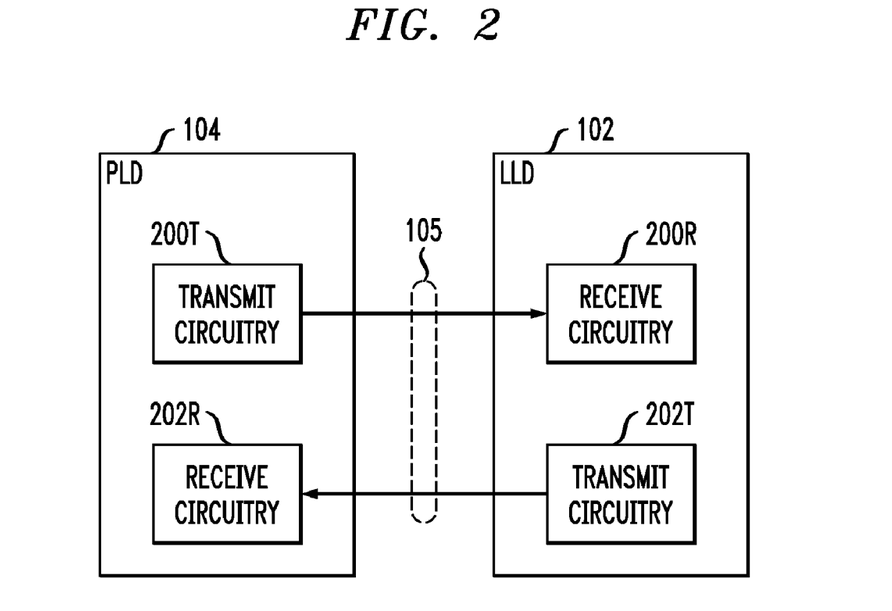
FIG. 2 shows a more detailed view of a portion of an interface between a link layer device and a physical layer device in the FIG. 1 system.

FIG. 2 shows a more detailed view of a portion of the interface between LLD 102 and PLD 104 in the system 100 of FIG. 1. The circuitry shown in this particular embodiment includes transmit circuitry 200T in the PLD 104 and receive circuitry 200R in the LLD 102 for supporting data transfer in a direction from the PLD to the LLD. The circuitry further includes transmit circuitry 202T in the LLD and receive circuitry 202R in the PLD for supporting data transfer in a direction from the LLD to the PLD. The circuitry 200, 202 may be configured in a conventional manner, for example, using known arrangements commonly used to implement POS-2 or SPI-3 interfaces. As is well known, such interfaces are implemented using an interface bus over which the PLD and LLD communicate.

Figure 3:
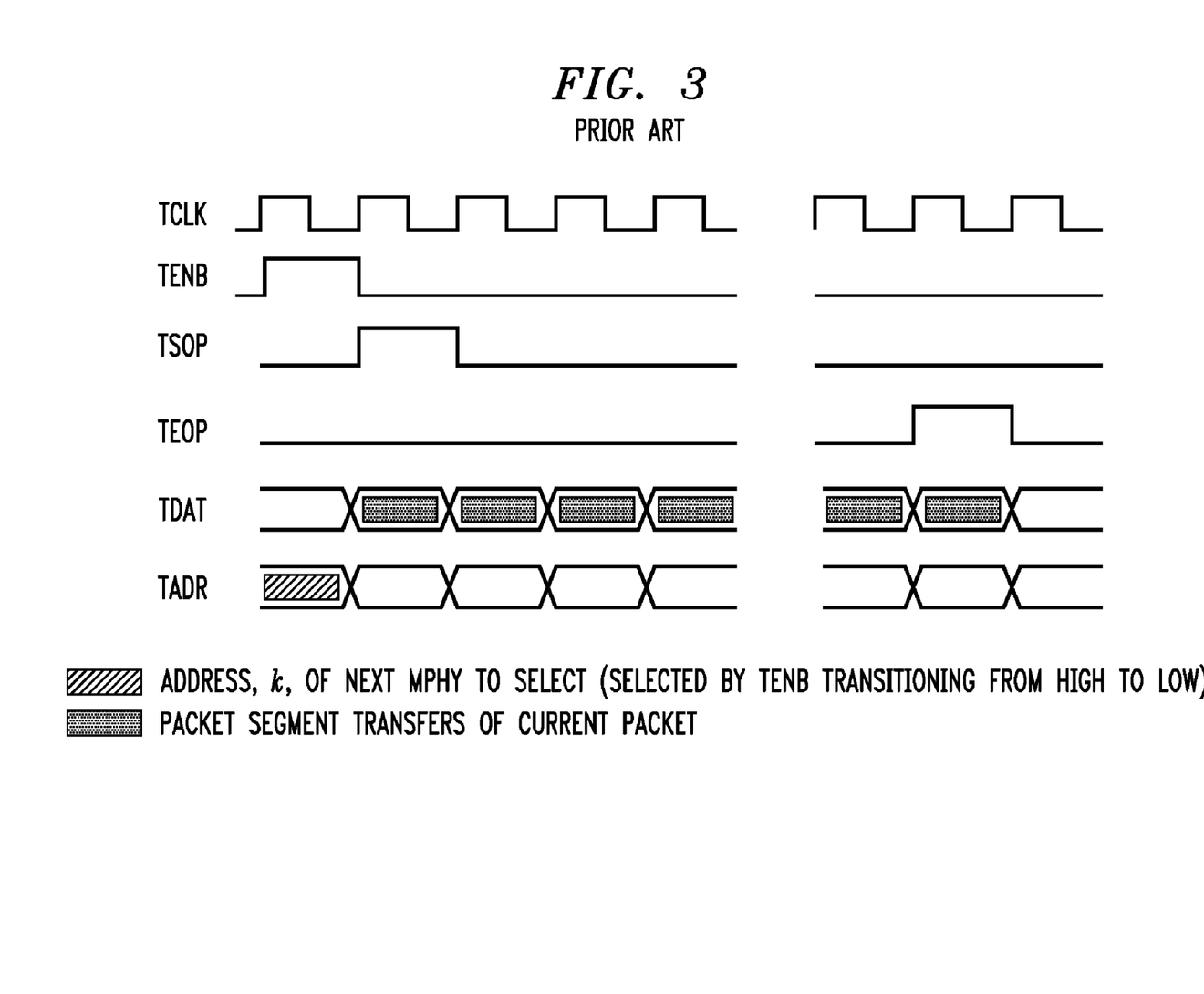
FIG. 3 shows conventional signaling associated with packet transfer over a POS-2 or SPI-3 interface.

With reference now to FIG. 3, conventional signaling associated with packet transfer over a POS-2 or SPI-3 interface is shown. Modifications to such an interface in accordance with an illustrative embodiment of the invention will subsequently be described with reference to the signaling diagram of FIG. 4. Again, the following description will refer to packets and POS-2 or SPI-3 interfaces, but it should be understood that the described techniques can be applied to cells or other PDUs, or more generally data segments, and to other types of interfaces.

As previously noted herein, a conventional POS-2 or SPI-3 interface allows packets to be transmitted to a set of logical ports, called MPHYs. The packets may be of variable length and may be transmitted as multiple segments. Typically all segments in such an arrangement are set to a preconfigured length L, except the last segment of a packet, which can be any length from 1 to L, given the variable-length nature of packets. A given segment in this arrangement may be a first segment of a multi-segment packet transfer, a last segment of a multi-segment packet transfer, or an intermediate segment of a multi-segment packet transfer. Although the signaling diagrams of FIGS. 3 and 4 assume multi-segment packet transfer, it is possible that a given packet may comprise only a single segment, in which case that single segment is both the first and the last segment of the packet transfer.

Conventional POS-2 or SPI-3 packet transfer for transmit and receive portions of the interface utilizes, among other signals, an enable signal denoted xENB, a start of packet (SOP) signal denoted xSOP and an end of packet (EOP) signal denoted xEOP, where x=T or R, for respective transmit or receive portion of the interface. The signaling shown in FIG. 3 is for a transmit portion of the interface, and hence these three signals are more specifically denoted TENB, TSOP and TEOP. Assertions of the TSOP and TEOP signals in this embodiment may be viewed as examples of what are more generally referred to herein as start indicators and end indicators, respectively. The figure also shows a clock signal TCLK, a data signal TDAT and an address signal TADR, all associated with the transmit portion of the interface. These signals are carried by an interface bus of the interface 105 in the illustrative embodiments.

The enable signal TENB is used to identify a specific MPHY to which the packet transfer is directed. This MPHY is identified by the address carried by TADR at the falling edge of the enable signal TENB, denoted address k in the figure. TSOP goes active during the clock cycle following assertion of TENB and signals the start of transmission of the first segment of the packet to the selected MPHY. TEOP goes active during the last clock cycle of the packet transfer and signals the transmission of the last segment of the packet to the selected MPHY. As shown in the figure, the transmitted segments are carried by the TDAT signal.

Thus, each packet transfer to an MPHY on a transmit or receive portion of the interface 105 comprises one or more segments, with the starting and ending segments being delineated via the assertion of the respective xSOP and xEOP signals during the transfer of the of the respective first and last segment(s) of that packet to the specific MPHY. As is known, packet transfers to different MPHYs may be interleaved by selecting a different MPHY using the xENB signal as described above.

A problem that arises in conventional packet transfer via the POS-2 or SPI-3 interfaces is that the standards require that for each assertion of xSOP for packet transfer to a particular MPHY, there should be one and only one corresponding assertion of xEOP. Therefore, if there are two assertions of xSOP to a given MPHY without an intervening assertion of xEOP, this is considered a protocol violation. As was indicated previously, this condition makes it difficult to implement packet preemption using conventional POS-2 or SPI-3 interfaces.

An illustrative embodiment disclosed in the above-cited U.S. patent application Ser. No. 11/536,191 overcomes this problem by permitting multiple assertions of xSOP without intervening assertions of xEOP. In this embodiment, multiple consecutive assertions of xSOP to the same MPHY but without intervening assertions of xEOP are recognized as being indicative of valid preemption transfers, as long as they are followed by the same number of consecutive assertions of xEOP. In other words, the xEOP assertions must balance the xSOP assertions to a given MPHY, or otherwise a protocol violation will be indicated.

Although this illustrative approach allows, for example, a single high-priority packet to preempt multiple low-priority packets, an improved technique is needed which provides efficient support for multiple preemptions of a given low-priority packet.

The illustrative embodiments of the present invention meet this need by providing an approach which involves the use of start indicators of different types. For example, the different start indicators may include a start indictor of a first type and a start indicator of a second type, where the start indicator of the second type has a pulse width that is longer than a pulse width of the start indicator of the first type. As a more specific example, the start indicator of the second type may have a pulse width that is approximately twice as long as a pulse width of the start indicator of the first type.

Generally, a start indicator of the first type is received, and then a start indicator of the second type is received. At least one data segment associated with the start indicator of the second type is allowed to preempt at least one data segment associated with the start indicator of the first type. Such an arrangement permits any desired number of separate preemptions, by simply asserting the start indicator of the second type for each of the preemptions. For example, a plurality of start indicators of the second type may be received, each having at least one data segment associated therewith, and at least one data segment associated with each of the start indicators of the second type is allowed to preempt at least one data segment associated with the start indicator of the first type.

In the illustrative embodiments, the start indicators of the first and second types have associated therewith respective end indicators of the first and second types. An end indicator associated with a given one of the start indicators of the second type may be received prior to another one of the start indicators of the second type.

The techniques of the present invention may make use of the multilevel preemption techniques of the above-cited U.S. patent application Ser. No. 11/536,191, although the present invention does not require multilevel preemption. As one example, multilevel preemptions may be confirmed as appropriate if multiple start indicators of the second type are balanced in number by corresponding end indicators of the second type.

Figure 4:
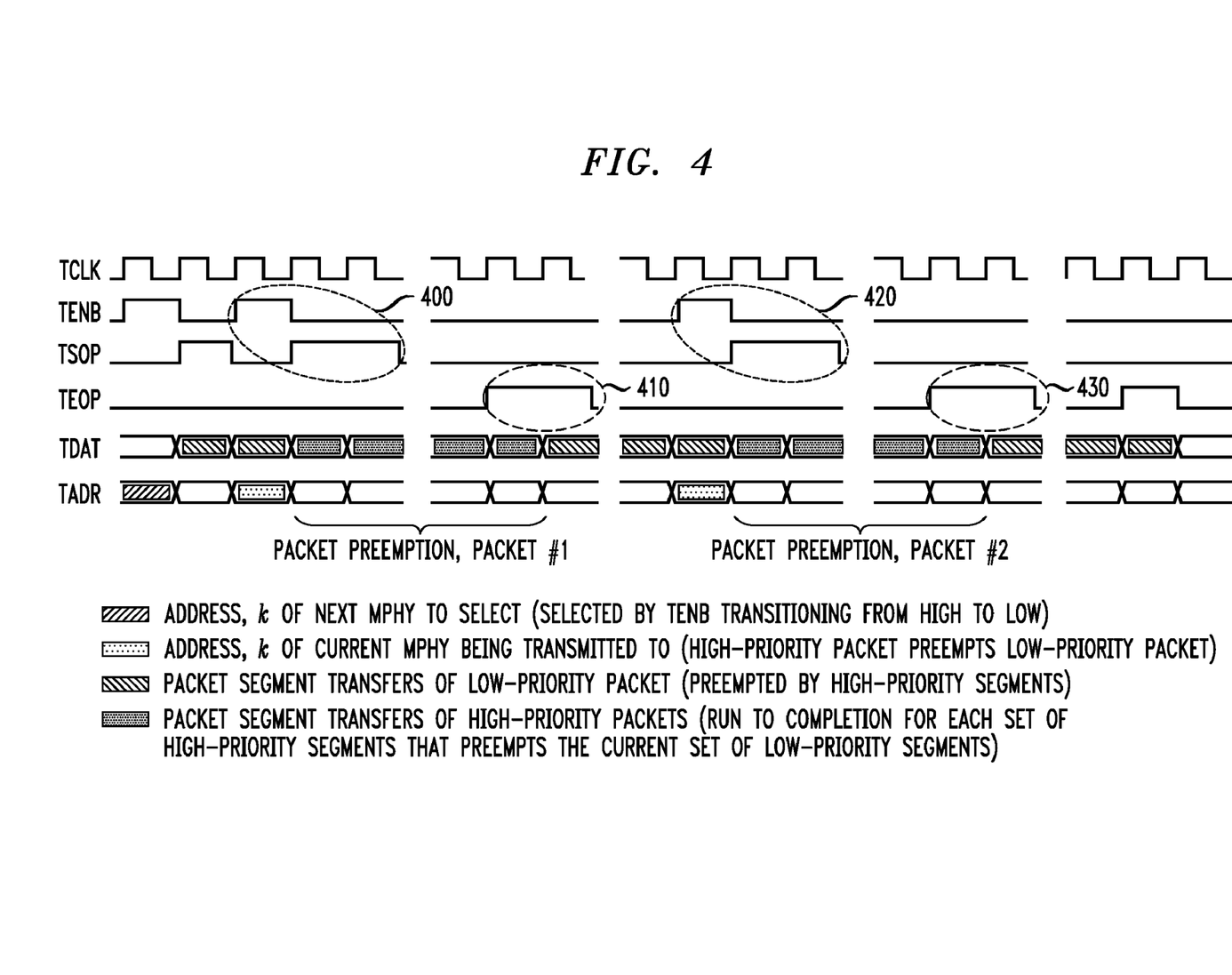
FIG. 4 shows modified signaling associated with implementation of multiple high-priority packet preemption in an otherwise conventional POS-2 or SPI-3 interface in an illustrative embodiment of the invention.

FIG. 4 shows an example of the modified interface signaling to implement the technique described above, with first and second high-priority packets, denoted Packet #1 and Packet #2, respectively, both preempting a single low-priority packet.

In this example, the enable signal TENB initiates a packet transfer to an MPHY having address k. This is followed on the next clock cycle by an assertion of TSOP, in accordance with the conventional POS-2 or SPI-3 interface standard. However, before the last segment of the packet is transmitted as indicated by an assertion of TEOP, the enable signal TENB initiates another packet transfer to the same MPHY, that is, the MPHY identified by address k. This is followed on the next clock signal by another assertion of TSOP, as indicated by reference numeral 400. It is assumed for this example that the initial packet is a low-priority packet, and is to be preempted by both the first and second high-priority packets. Such preemption would not be possible using the conventional POS-2 or SPI-3 interface, as the second assertion of TENB and TSOP before an intervening assertion of TEOP would be considered a protocol violation and would be signaled as such.

The present illustrative embodiment does not signal this condition as a protocol violation, but instead allows the first high-priority packet to preempt the low-priority packet as shown in the figure. Thus, transmission of the segments of the low-priority packet is interrupted, and transmission of the segments of the first high-priority packet commences.

The first high-priority packet is allowed to preempt the low-priority packet in this embodiment based on the type of start indicator associated with the high-priority packet. As is apparent from the figure, the second assertion of TSOP has a pulse width that is approximately twice the pulse width of the first assertion of TSOP. Thus, this embodiment configures the interface to recognize two different types of start indicators, and to allow packets having one type of start indicator to preempt packets having another type of start indicator.

Advantageously, such an approach allows any number of consecutive preemptions. Thus, multiple high-priority packets can preempt a single low-priority packet.

Transmission of the final segment of the first high-priority packet is indicated by a corresponding assertion of TEOP as shown at 410. The transmission of the segments of the low-priority packet then picks up from the point at which such transmission was interrupted by the first high-priority packet. Like the TSOP for this high-priority packet, the TEOP 410 also has an extended pulse width, namely one that is approximately twice the pulse width of the TEOP associated with the low-priority packet.

Continuing with the present example, TENB and TSOP signals for a second high-priority packet are received as indicated at 420. As is apparent from the figure, this assertion of TSOP also has a pulse width that is approximately twice the pulse width of the assertion of TSOP for the low-priority packet. The corresponding second high-priority packet is therefore also permitted to preempt the low-priority packet, for which data segments were again being transmitted after all data segments of the first high-priority packet were transmitted. Thus, transmission of data segments from the low-priority packet is again interrupted.

Transmission of the final segment of the second high-priority packet is indicated by a corresponding assertion of TEOP as shown at 430. The transmission of the segments of the low-priority packet then picks up from the point at which such transmission was interrupted by the second high-priority packet. Like the TSOP for this second high-priority packet, the TEOP 430 also has an extended pulse width, namely one that is approximately twice the pulse width of the TEOP associated with the low-priority packet.

The final segment of the low-priority packet is eventually transmitted, as indicated by a corresponding TEOP.

In the example shown in FIG. 4, transfer of a given low-priority packet uses the conventional TSOP and TEOP signal pair of the type shown in FIG. 3, while each preemptive transmission of a high-priority packet uses a TSOP and TEOP signal pair of a different type, namely, an extended duration TSOP and TEOP signal pair. The double-length TSOP and TEOP signals used in this particular example may be replaced with other types of distinctive start indicator and end indicator signaling arrangements in alternative embodiments. For example, a triple-length start indicator signal may be used, such that the high-priority TSOP signal has a pulse width approximately three times that of the low-priority TSOP signal. Numerous other types of signaling arrangements are possible, including arrangement that use signal characteristics other than pulse length to distinguish the first and second types of start indicators. In a given one of such arrangements, start indicators of first and second types may be associated with respective low-priority and high-priority packets, with detection of the start indicator of the second type being used to control preemption of at least one segment of the low-priority packet by at least one segment of the high-priority packet.

The packet preemption process as illustrated in FIG. 4 for a transmit portion of the interface 105 may be implemented in a similar manner for a receive portion of the interface 105. One skilled in the art could readily configure the circuitry 200, 202 as shown in FIG. 2 to distinguish between start indicators of first and second types so as to allow multiple high-priority packets to preempt a single low-priority packet as described above.

Advantageously, the illustrative embodiments allow packet preemption to be implemented in an efficient manner using otherwise conventional interface standards such as POS-2 and SPI-3. This can considerably reduce the cost and complexity associated with the provision of packet preemption in DSL applications such as the above-described VDSL-2, as well as a wide variety of other communication system applications.

The packet preemption techniques of the illustrative embodiments may be implemented at least in part in the form of software program code. For example, these techniques may be implemented at least in part utilizing LLD or PLD elements that are programmable via instructions or other software.

An LLD or PLD in accordance with the invention may be implemented as an integrated circuit device suitable for installation, for example, on a line card or port card of a router or switch. Numerous other configurations are possible.

In a given integrated circuit implementation, identical die are typically formed in a repeated pattern on a surface of a semiconductor wafer. Each die includes at least a portion of at least one device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Again, the above-described embodiments of the invention are intended to be illustrative only. For example, although illustrated using POS-2 and SPI-3 interfaces, the invention can adapted in a straightforward manner for use with other types of standard or non-standard interfaces. Also, the particular arrangement of LLD, PLD, interface bus, switch fabric and other elements as shown in FIG. 1 may be varied in alternative embodiments. The particular types of indicators, signals and other features used in the illustrative embodiments may be altered to suit the needs of a wide variety of other applications. These and numerous other alternative embodiments within the scope of the following claims will be readily apparent to those skilled in the art.

What is claimed is:

1. A method of processing data segments communicated between a physical layer device and a link layer device via an interface bus, the method comprising the steps of:
   receiving a start indicator of a first type;
   receiving a start indicator of a second type; and
   allowing at least one data segment associated with the start indicator of the second type to preempt at least one data segment associated with the start indicator of the first type;
   the interface bus comprising multiple signal lines;
   wherein the data segments are part of a data signal received over at least a first signal line of the interface bus; and
   wherein the start indicators are part of a start of packet signal received over a second signal line of the interface bus separate from and in parallel with said data signal.

2. The method of claim 1 wherein the start indicator of the second type is longer in duration than the start indicator of the first type.

3. The method of claim 1 wherein the start indicator of the second type has a pulse width that is longer than a pulse width of the start indicator of the first type.

4. The method of claim 3 wherein the start indicator of the second type has a pulse width that is approximately twice as long as a pulse width of the start indicator of the first type.

5. The method of claim 1 wherein the start indicators of the first and second types have associated therewith respective end indicators of the first and second types.

6. The method of claim 1 wherein a plurality of start indicators of the second type are received, each having at least one data segment associated therewith, and at least one data segment associated with each of the start indicators of the second type is allowed to preempt at least one data segment associated with the start indicator of the first type.

7. The method of claim 6 wherein an end indicator associated with a given one of the start indicators of the second type is received prior to another one of the start indicators of the second type.

8. The method of claim 6 wherein the plurality of start indicators of the second type are balanced in number by a corresponding plurality of end indicators of the second type.

9. The method of claim 1 wherein the data segments associated with the start indicators comprise at least a portion of respective first and second packets.

10. The method of claim 5 wherein the start indicators comprise start of packet indicators and the end indicators comprise end of packet indicators.

11. The method of claim 1 wherein the interface is configured in accordance with one of a Packet over SONET Level 2 (POS-2) interface protocol and a System Packet Interface Level 3 (SPI-3) interface protocol.

12. The method of claim 1 wherein the data segments are directed to a common logical port address.

13. The method of claim 6 wherein said plurality of start indicators comprise multiple assertions of the start of packet signal for a same logical port, each of said assertions of the start of packet signal having a corresponding assertion of an end of packet signal.

14. An apparatus comprising:
   a first device configured for communication with a second device via an interface bus;
   the first device comprising interface circuitry configured to receive from the second device a start indicator of a first type and a start indicator of a second type, and to allow at least one data segment associated with the start indicator of the second type to preempt at least one data segment associated with the start indicator of the first type;
   the interface bus comprising multiple signal lines;
   wherein the data segments are part of a data signal received over at least a first signal line of the interface bus; and
   wherein the start indicators are part of a start of packet signal received over a second signal line of the interface bus separate from and in parallel with said data signal.

15. The apparatus of claim 14 wherein one of the first and second devices comprises a physical layer device and the other of the first and second devices comprises a link layer device.

16. The apparatus of claim 15 wherein at least one of the physical layer device and the link layer device is implemented as an integrated circuit.

17. The apparatus of claim 15 wherein the physical layer device comprises a digital subscriber line transceiver.

18. The apparatus of claim 15 wherein the link layer device comprises a network processor.

19. A communication system comprising:
   a link layer device; and
   a physical layer device;
   the link layer device and the physical layer device being coupled together via an interface bus;

at least one of the link layer device and the physical layer device being configured to receive from the other a start indicator of a first type and a start indicator of a second type, and to allow at least one data segment associated with the start indicator of the second type to preempt at least one data segment associated with the start indicator of the first type;

the interface bus comprising multiple signal lines;

wherein the data segments are part of a data signal received over at least a first signal line of the interface bus; and wherein the start indicators are part of a start of packet signal received over a second signal line of the interface bus separate from and in parallel with said data signal.

20. The system of claim 19 wherein a plurality of start indicators of the second type are received, each having at least one data segment associated therewith, and at least one data segment associated with each of the start indicators of the second type is allowed to preempt at least one data segment associated with the start indicator of the first type.

* * * * *